Dec. 11, 1962 R. KORPMAN 3,068,117
PRESSURE SENSITIVE ADHESIVE TAPE HAVING PRIMER
COATING OF REACTION PRODUCT OF EPOXY-REACTIVE
ELASTOMER AND EPOXY RESIN
Filed Sept. 16, 1959

*Fig. 1*

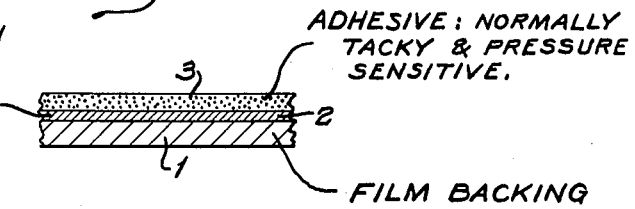

PRIMER (REACTION PRODUCT OF EPOXY-REACTIVE ELASTOMER AND EPOXY RESIN)

ADHESIVE: NORMALLY TACKY & PRESSURE SENSITIVE.

FILM BACKING

*Fig. 2*

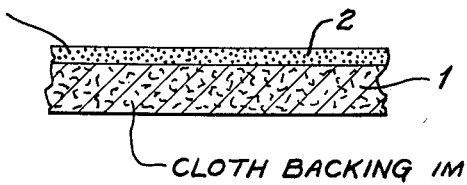

ADHESIVE: NORMALLY TACKY & PRESSURE SENSITIVE

CLOTH BACKING IMPREGNATED WITH BARRIER COMPOSITION (REACTION PRODUCT OF EPOXY-REACTIVE ELASTOMER AND EPOXY RESIN)

INVENTOR.
RALF KORPMAN
BY
Morgan, Finnegan, Durham & Pine
ATTORNEYS.

United States Patent Office 3,068,117
Patented Dec. 11, 1962

3,068,117
PRESSURE SENSITIVE ADHESIVE TAPE HAVING PRIMER COATING OF REACTION PRODUCT OF EPOXY-REACTIVE ELASTOMER AND EPOXY RESIN
Ralf Korpman, East Brunswick, N.J., assignor to Johnson & Johnson, a corporation of New Jersey
Filed Sept. 16, 1959, Ser. No. 840,409
8 Claims. (Cl. 117—76)

This invention relates to improvements in normally tacky and pressure-sensitive tapes. The invention also includes novel compositions of matter useful as primer compositions in normally tacky and pressure-sensitive adhesive tapes employing backings of both the non-porous, film type and the non-film, porous type. This invention also relates to novel compositions of matter useful as barrier composition for porous backings of normally tacky and pressure-sensitive adhesive tape.

Pressure-sensitive adhesive tapes require secure bonds of the tacky pressure-sensitive adhesive to the backings so as to prevent transfer of adhesive when the tacky surface is pressed into contact with itself, or with a part of the backing, and then pulled apart. Such bonding is accomplished usually by interposing a primer coat between the pressure-sensitive adhesive layer and the flexible backing.

Many of the primer compositions of the prior art require a long period of aging for adequate bonding to the tape backing. Accordingly, in many instances, there is a delay of many days before the adhesive coat may be safely applied to the primed backing. Certain of the heretofore known primers show poor anchorage of primer and/or adhesive mass on tape aging. Other known primer compositions are readily attacked by solvents, oils, and the like, resulting in weakening of the primer bond. With many of the known primer compositions, there is effectuated a weakening of the primer bond when such compositions are subjected to elevated temperature conditions.

In normally tacky and pressure-sensitive tapes employing porous backings such, for example, as cloth, paper, and the like, unless a barrier coat is employed, there is extensive migration of the adhesive through the cloth. This is undesirable since it increases adhesion to backing when a roll of such tape is unwound, as well as lowering production yield.

Objects and advantages of the invention will be set forth in part hereinafter and in part will be obvious herefrom, or may be learned by practice with the invention, the same being realized and attained by means of the steps, methods, compositions, combinations and improvements pointed out in the appended claims.

The invention consists in the novel steps, methods, compositions, combinations and improvements herein shown and described.

Accordingly, it is an objects of this invention to provide an improved primer composition adapted to bond conventionally normally tacky and pressure-sensitive adhesive compositions to various backings normally employed in pressure-sensitive tapes. A further object of this invention is to provide improved primer compositions which bond to conventional tape backings within a relatively short period of time whereby normally tacky and pressure-sensitive adhesives may be applied to the primed backings without undue delay. Yet a further object of this invention is the provision of improved primer compositions possessing good resistance to attack by solvents, oils, and the like. A still further object of this invention is the provision of improved primer compositions possessing good high temperature stability. A still further object of this invention is the provision of normally tacky and pressure-sensitive adhesive tapes having coated thereon a primer composition having the characteristics set forth in the foregoing objects. Yet a further object of this invention is to provide an improved barrier compositions which when coated on a porous backing prevents migration of a normally tacky and pressure-sensitive adhesive coated thereon through the porous backing. A further object of this invention is the provision of normally tacky and pressure-sensitive adhesive tapes having coated thereon a barrier composition having the attributes set forth in the foregoing object. Yet a further object of this invention is to provide novel methods for the manufacture of compositions, and adhesive tapes employing such compositions, having the properties set forth in the foregoing objects.

Of the drawings:

FIG. 1 is a cross-sectional view of a film backed pressure-sensitive adhesive tape employing a primer composition in accordance with the present invention.

FIG. 2 is a cross-sectional view of a cloth backed pressure-sensitive adhesive tape using a barrier composition in accordance with the present invention.

In accordance with one aspect of this invention, a primer composition may be formed by mixing together an epoxy resin and a water-insoluble, curable elastomeric polymer having reactive groups capable of reacting with said epoxy resin, referred to hereinafter as "epoxy-reactive elastomer." The epoxy resin and epoxy-reactive elastomer are in amounts described hereinlater in detail, the amount of epoxy resin varying depending upon the particular epoxy-reactive elastomer that is employed.

Any water-insoluble rubbery elastomeric polymer having reactive groups capable of reacting with an epoxy resin may be used as one of the essential components of the primer composition of this invention. Preferably, the elastomeric polymer has reactive carboxylic groups, although the reactive groups may be other than carboxylic such, for example, as amide, amine, bromine, chlorine, etc. Examples of suitable polymers are diene polymers and copolymers having reactive carboxylic groups such, for example, as carboxylic modified isoprene polymers, butadiene-styrene copolymers, polybutadiene and isobutylene-diene copolymers. Specific examples of polymers of the aforementioned type are as follows:

*Epoxy-Reactive Elastomer A*

A crude rubber which has 2.5% by weight combined maleic anhydride and 1.2% by weight uncombined maleic anhydride. This polymer has a Mooney viscosity of 50.

*Epoxy-Reactive Elastomer B*

A butyl rubber which has 1.0% by weight combined maleic anhydride and 1.2% by weight uncombined maleic anhydride. This copolymer has a Mooney viscosity of 30.

*Epoxy-Reactive Elastomer C*

A butadiene-styrene copolymer (75:25 monomer ratio) which is carboxylated 15% by weight and which has a Mooney viscosity of 50.

*Epoxy-Reactive Elastomer D*

A butadiene-acrylonitrile copolymer (medium high) which is carboxylated 2.5% by weight and which has a Mooney viscosity of 50–75. This copolymer is manufactured by the B. F. Goodrich Company and sold under the trade name "Hycar 1072."

Epoxy-Reactive Elastomer E

A liquid butadiene-acrylonitrile copolymer (medium high) containing carboxyl groups about 0.09 gram equivalents per 100 grams of copolymer. This copolymer has a Brookfield viscosity of about 100,000 cps. at room temperature. It is manufactured by the B. F. Goodrich Company and sold under the trade name "Hycar 1300-X-2."

If so desired, the primer composition of this invention may have incorporated therein modifying elastomeric polymers. If a modifying elastomer is employed, preferably it is of such nature that it exhibits a high affinity for the elastomeric component of the adhesive to be anchored by the primer composition. Good results are obtained when the epoxy-reactive elastomer is in an amount at least about 10% by weight, and preferably at least about 25% by weight of the total elastomeric content. The term "total elastomeric content" includes all of the rubbery components present in the primer.

Examples of suitable modifying elastomeric polymers for this purpose are diene polymers such, for example, as isoprene polymer (natural rubber) and polybutadiene; dienestyrene and styrene homolog copolymers, such, for example, as a butadiene-styrene copolymer (75:25 monomer ratio) manufactured by the United States Rubber Company and sold under the trade name "GRS 1022"; polybutadiene; isobutylene-diene copolymers such, for example, as butyl rubber; and diene-nitrile copolymers such, for example, a butadiene-acrylonitrile copolymer (medium high) having a Mooney viscosity of 47–50 which is manufactured by the B. F. Goodrich Chemical Company and sold under the trade name "Hycar 1022."

The epoxy resins used in this invention are formed by the reaction of a polyhydric alcohol or phenol with a halohydrin such, for example, as an epihalohydrin. Epoxy resins or ethers which may be used in accordance with this invention are exemplified by those disclosed in U.S. Patents 2,801,229, 2,735,829, 2,553,718 and 2,716,099. Specific examples of typical epoxy resins used in accordance with this invention are as follows:

EXAMPLE A

Bis-phenol is dissolved in epichlorhydrin in the proportion of 5130 parts (2.5 mols) of bis-phenol in 20,812 parts (225 mols) of epichlorhydrin and 104 parts of water. The solution is prepared in a kettle provided with heating and cooling equipment, agitator, distillation condenser and receiver. A total of 1880 parts of solid 97.5% sodium hydroxide, corresponding to 2.04 mols of sodium hydroxide per mol of bis-phenol (2% excess is added in installments. The first installment of 300 parts of sodium hydroxide is added and the mixture heated with efficient agitation. The heating is discontinued as the temperature reaches 80° C. and cooling is started in order to cool the exothermic heat of reaction. The control is such that the temperature rises only to about 100° C. When the exothermic reaction has ceased and the temperature has fallen to 97° C., a further addition of 316 parts of sodium hydroxide is made and similar further additions are effected at successive intervals. An exothermic reaction takes place after each addition. Sufficient cooling is applied so there is gentle distillation of epichlorhydrin and water, but the temperature is not allowed to go below about 95° C. No cooling is necessary after the final addition of sodium hydroxide. After the last addition of sodium hydroxide with completion of the reaction the excess epichlorhydrin is removed by vacuum distillation with use of a kettle temperature up to 150° C. and a pressure of 50 mm. Hg. After completion of the distillation, the residue is cooled to about 90° C. and about 360 parts of benzene added. Cooling drops the temperature of the mixture to about 40° C. with precipitation of salt from the solution. The salt is removed by filtration and the removed salt carefully washed with about an additional 360 parts of benzene to remove polyether therefrom. The two benzene solutions are combined and distilled to separate the benzene. When the kettle temperature reaches 125° C., vacuum is applied and distillation continued to a kettle temperature of 170° C. at 25 mm. pressure. The resulting glycidyl polyether of bis-phenol has a Durrans' mercury method softening point of 10° C., an average molecular weight of 360 ebullioscopic measurement in ethylene dichloride, and an epoxide value of 0.538 epoxy equivalent per 100 grams. It has an epoxide equivalent weight of 186 and a 1,2-epoxy equivalency of 1.93.

EXAMPLE B

A solution is prepared by dissolving 2,2-bis (4-hydroxy-phenyl)-propane in slightly aqueous epichlorhydrin in the proportion of 5,130 parts (22.5 mols) of the dihydric phenol in 20,812 parts (225 mols) of epichlorhydrin and 104 parts of water. The solution is prepared in a kettle provided with heating and cooling equipment, agitator, distillation condenser and receiver. A total of 1880 parts of solid 97.5% sodium hydroxide, corresponding to 2.04 mols of sodium hydroxide per mole of bis-phenol (2% excess) is added in installments. The first installment of 300 parts of sodium hydroxide is added and the mixture heated with efficient agitation. The heating is discontinued as the temperature reaches 80° C. and cooling is started in order to remove exothermic heat of reaction. The control is such that the temperature rises only to about 100° C. When the exothermic reaction has ceased and the temperature has fallen to 97° C., a further addition of 316 parts of sodium hydroxide is made and similar further additions are effected at successive intervals. An exothermic reaction takes place after each addition. Sufficient cooling is applied so there is gentle distillation of epichlorhydrin and water, but the temperature is not allowed to go below about 95° C. No cooling is necessary after the final addition of sodium hydroxide. After the last addition of sodium hydroxide with completion of the reaction, the excess epichlorhydrin is removed by vacuum distillation with use of a kettle temperature up to 150° C. and a pressure of 50 mm. Hg. After completion of the distillation, the residue is cooled to about 90° C. and about 360 parts of benzene are added. Cooling drops the temperature of the mixture to about 40° C. with precipitation of salt from the solution. The salt is removed by filtration and the removed salt carefully washed with about an additional 360 parts of benzene to remove polyether therefrom. The two benzene solutions are combined and distilled to separate the benzene. When the kettle temperature reaches 125° C., vacuum is applied and distillation continued to a kettle temperature of 170° C. at 25 mm. pressure. The resulting liquid glycidyl polyether of 2,2-bis(4-hydroxyphenyl) propane has the following properties.

| | |
|---|---|
| Durrans' melting point °C | 9 |
| Molecular weight | 370 |
| Epoxide value (epoxide equivalents per 100 grams) | 0.50 |
| Epoxide equivalent weight | 200 |
| Hydroxyl value (hydroxyl equivalents per 100 grams) | 0.08 |
| Percent chlorine | 0.46 |

From the above values, $n$ is 0.106 so the average molecule of the polyether contains 1.106 of the aromatic radicals therein. The 1,2-epoxy equivalency of the product is 1.85.

EXAMPLE C

An epoxy ether resin is prepared by reacting 2.04 mols of epichlorhydrin with 1 mol of bis-(4-hydroxyphenyl)-2,2-propane (known to those skilled in the art as bis-phenol) in the presence of 2.14 mols of sodium hydroxide (5% excess). The resin is obtained by preparing a solution with 2280 parts of water, 245 parts of sodium hydroxide and 640 parts of bisphenol. This solution in a reaction vessel fitted with a stirrer is heated to about 45° C. whereupon 530 parts of epichlorhydrin are rapidly added while agitating the reaction mixture. In about 50 minutes, the temperature of the reaction mixture, without application of external heat, rises to about 95° C. from the exothermic heat of reaction. As the resin is formed, the reaction mixture separates into a two phase system consisting of an equeous phase and a molten taffy-like resin phase. About 80 minutes after the epichlorhydrin is added, the aqueous layer is removed and the molten resin is washed continuously with hot water until the wash water is neutral to litmus. Then the water is drained from the resin and the resin heated at about 140° C. with agitation until dry. The molten resin is cooled and flaked.

EXAMPLE D

A solution consisting of 11.7 parts of water, 1.22 parts of sodium hydroxide, and 13.38 parts of bis-phenol is prepared by heating the mixture of ingredients to 70° C. and then cooling to 46° C. at which temperature 14.06 parts of epichlorhydrin are added while agitating the mixture. After 25 minutes has elapsed, there is added during an additional 15 minutes' time a solution consisting of 5.62 parts of sodium hydroxide in 11.7 parts of water. This causes the temperature to rise to 63° C. Washing with water at 20 to 30° C. temperature is started 30 minutes later and continues for 4½ hours. The product is dried by heating to a final temperature of 140° C. in 80 minutes, and cooled rapidly. At room temperature, the product is an extremely viscous, semi-solid having a melting point of 27° C. by Durrans' mercury method and an epoxide equivalent weight of 249.

Commercial examples of typical epoxy resins useful in accordance with this invention are those manufactured by the Ciba Co. and sold under the trade names "Araldite 502," "Araldite 6005," "Araldite 6020" and "Araldite 6010"; those manufactured by Bakelite Division of Union Carbide and Carbon Co. and sold under the trade names "Bakelite 2795" and "Bakelite 3794," those manufactured by the Shell Chemical Company and sold under the trade names "Epon 828," "Epon 834," "Epon 1001" and "Epon 1310," and those manufactured by the Borden Company and sold under the rade name "Epiphen" such, for example, as "Epiphen 851." The physical properties of the above mentioned epoxy resins are shown in the following Table I:

Table I

| Epoxy resin | Base phenol | Halo-hydrin | Viscosity, centipoises | Epoxy equivalent |
|---|---|---|---|---|
| "Araldite 502" | Bis phenol A | Epichlor-hydrin | 4,500 | 0.38 |
| "Araldite 6005" | ___do___ | ___do___ | 10,500–17,000 | 0.51–.54 |
| "Araldite 6010" | ___do___ | ___do___ | 18,000 | 0.51 |
| "Araldite 6020" | ___do___ | ___do___ | 20,000–30,000 | 0.47–.495 |
| "Araldite 6060" | ___do___ | ___do___ | (1) | 0.23 |
| "Bakelite 2795" | Bis phenol A about 10% reactive diluent | ___do___ | 500–900 | 0.54 |
| "Bakelite 3794" | Bis phenol A with a small amount of a trihydric phenol | ___do___ | 7,000–19,000 | 0.57 |
| "Epon 828" | Bis phenol A | ___do___ | 13,500–19,500 | 0.51 |
| "Epon 834" | Polyhydric phenol | ___do___ | (2) | 0.39 |
| "Epiphen 851" | Novolac | ___do___ | 2,000–8,000 | 0.55 |

1 M.P. 50–70° C. (Durrans).  2 M.P. 27° C. (Durrans).

Further examples of epoxy resins used in this invention are those manufactured by reacting novolac resins and epihalohydrins such as epichlorohydrin. As well known to those skilled in the art, novolac resins are phenol-formaldehyde resins prepared by reacting less than one mole formaldehyde per mole of phenol. The novolac resins structurally resemble dihydroxy diphenyl methane and their chains are phenol ended. These resins are described in the "Chemistry of Phenolic Resins," book authorized by Martin and published by Wiley & Sons, 1956, p. 87. Epoxidized novolac resins are disclosed in U.S. Patents 2,658,884, 2,658,885 and 2,716,099.

With respect to the proportions of the components used in accordance with this invention, the following comments are made: The epoxy resin should be in an amount sufficient to give adequate curing of the epoxy-reactive elastomer and be compatible with the elastomeric components of the primer. It is preferred that the ratio of epoxy-reactive elastomer to epoxy resin be such that some reactive groups remain in the epoxy-reactive elastomeric polymer after curing so as to be available for subsequent reaction with a reactive component of the adhesive, such, for example, as zinc oxide or zinc resinate. This gives improved anchoring of the adhesive to the primer. For convenience sake, the amounts of epoxy resin is expressed in parts per 100 parts of the total elastomeric components. As indicated hereinbefore, the term "total elastomeric components" includes the epoxy-reactive elastomer and a modifying elastomer, if any, which may be present; the epoxy-reactive elastomer being in an amount at least 10% by weight, and preferably at least 25% by weight of the total elastomeric components.

As indicated hereinbefore, the amount of epoxy resin that is used varies depending upon the particular epoxy-refractive elastomeric polymer that is employed. Preferably, the epoxy-reactive elastomer is a solid, while it is preferred that the epoxy resin be a liquid. It has been found that epoxy resins are more compatible in epoxy-reactive diene-nitrile copolymers such, for example, as epoxy-reactive butadiene acrylonitrile copolymers, than in the other epoxy-reactive elastomeric polymers disclosed herein.

In the discussion which follows, the term "parts" means part by weight. When the epoxy-reactive elastomer is an epoxy-reactive butadiene-acrylonitrile elastomer, the epoxy resin is generally in an amount from about 5 to 20 parts, and, preferably, about 10 to 18 parts, per 100 parts of the total elastomeric components. When the epoxy-reactive elastomer is an epoxy-reactive diene polymer or epoxy-reactive isobutylene-diene copolymer, the epoxy resin is generally in an amount from about 1 to 15 parts, and, preferably, from about 5 to 10 parts per 100 parts of the total elastomeric components. When the epoxy-reactive elastomer is an epoxy-reactive diene-styrene copolymer, the epoxy resin is generally in an amount from about 1 to 20 parts, and, preferably, from about 5 to 10 parts, per 100 parts of total elastomeric components.

As indicated hereinbefore, the primer compositions of this invention have been found to be very effective for anchoring conventional normally tacky and pressure-sensitive adhesives to conventional tape backings. The primer of this invention is preferably applied to a tape backing in a very thin coat at a coating weight of about one hundredth to about one quarter of one ounce dry weight per square yard dry weight, and, preferably, about 0.01 to 0.03 oz./sq. yd., and dried for a short time at moderate temperatures. The lower weights of primer are most suitable for films while the upper range is used for woven or non-woven fibrous backings. A pressure-sensitive adhesive compound may then be applied to the primed sheet at a dry coating weight from about one-half to about five ounces per square yard. For best results, the primer and adhesive are both applied from compatible elastomer solvents, e.g., toluene.

As shown in FIG. 1 of the accompanying drawings, the primer is coated on one side of a film backing and the adhesive is coated over the primer coat, the primer coat anchoring the adhesive coat to the backing.

As indicated heretofore, the composition of this invention, in addition to being useful as primers, are also useful as barrier coats for preventing migration of an adhesive through a porous tape backing. When used as a barrier coat, the compositions of this invention are applied to the porous backing at a coating weight of about 0.1 to 0.4 dry weight per square yard, and, preferably, about 0.1 to 0.20 oz./sq. yd.

As shown in FIG. 2 of the accompanying drawings, the barrier composition is coated on one side of a cloth backing and the adhesive is coated over the barrier coat, the barrier coat preventing migration of the adhesive through the cloth backing.

In forming adhesive tapes in accordance with the present invention, the primer, or barrier coat if used as such, is coated on the backing sheet by any conventional method such as spraying, printing, knife coating, or reverse roll coating. The backing sheet is maintained in contact with the primer coat or barrier coat for a sufficient aging period whereby the primer or barrier coat is strongly bonded to the backing. The aging or curing of the primer or barrier coat not only effects proper bonding of the primer or barrier coat to the backing, but also it improves the solvent, oil, and the like resistance of the primer or barrier coat, as well as imparting thereto good high temperature stability characteristics. As will be understood by those "Neoprene WRT" is a stabilized polymerized chloroprene manufactured by Du Pont Company, having a Mooney plasticity of 0.120 inch at 176° F.

"GRS 1022" is a butadiene-styrene copolymer containing 23.5% bound styrene and rosin emulsifier and has a Mooney viscosity at 54.

"Piccolyte S115" and "Piccolyte S40" are polyterpene resins, manufactured by Penn Industrial, which are polymers of beta pinene and having melting points of 115° C. and 40° C., respectively.

"Amberol ST137" is a heat reactive, oil soluble phenolic resin made from reacting one mole of a para tert. octyl phenol and one and one-half moles formaldehyde under alkaline conditions and reacted to a softening point of 85° C.

"Staybelite Ester #3" is a pale colored, thermoplastic acid resin made by hydrogenating wood rosin.

"Galex" is dehydroabietic acid manufactured by National Rosin and Oil Company.

"Schenectady SP 103" is a non-heat reactive phenol-formaldehyde resin manufactured by Schenectady Varnish Company.

|  | Example 1 | Example 2 | Example 3 | Example 4 | Example 5 | Example 6 | Example 7 | Example 8 |
|---|---|---|---|---|---|---|---|---|
| Barriers 7–8, primers 1–6: |  |  |  |  |  |  |  |  |
| Araldite 6005 | 20 | 10 | 10 | 10 | 10 |  | 20 | 20. |
| Hycar 1072 | 100 | 80 |  |  | 80 | 80 | 100 | 100 | 80. |
| Pale crepe |  |  | 20 |  |  |  |  |  |
| Neoprene WRT |  |  |  | 100 |  |  |  |  |
| Epoxy-reactive elastomer A. |  |  |  | 20 |  |  |  | 20. |
| GRS 1022 |  |  |  |  |  | 20 |  |  |
| Araldite 6060 |  |  |  |  |  | 20 |  |  |
| Backings | 1 mil mylar film | 2 mil mylar film | 2 mil acetate film | 2 mil nylon film | ½ mil mylar film | 1 mil acetate film | Acetate cloth | Glass cloth. |
| Adhesives: |  |  |  |  |  |  |  |  |
| Piccolyte S115 |  |  |  |  |  | 60 |  | 60. |
| Hycar 1072 | 100 |  |  |  | 100 |  |  |  |
| Araldite 6005 | 100 |  |  |  | 100 |  |  |  |
| Pale crepe |  | 50 | 50 | 100 |  | 100 | 50 | 100. |
| GRS 1022 |  | 50 | 50 |  |  |  | 50 |  |
| Zinc oxide |  | 50 | 50 | 50 |  | 60 | 50 | 60. |
| Piccolyte S40 |  | 100 |  |  |  |  | 100 |  |
| Amberol ST137 |  | 20 | 20 | 20 |  |  | 20 |  |
| Staybelite ester #3 |  |  | 100 |  |  |  |  |  |
| Galex |  |  |  | 50 |  |  |  |  |
| Schenectady SP103 |  |  |  |  | 20 |  |  |  | skilled in the field, the particular temperature for aging will vary depending upon the reactivity of the components of the primer or barrier coat; the time permitted for aging and the temperature at which the backing to which the primer or barrier coat is secured would be harmed. Of course, as the temperature for aging is increased, the required time for aging is decreased. For example, a primer containing 100 parts of "Hycar 1072" and 20 parts of "Araldite 6005" when applied to a 1 mil "Mylar" backing at a coating weight of 0.02 oz./sq. yd. can be effectively bonded to said backing at room temperature in about 24 hours or at 280° F. in about 3 minutes or at 350° F. in about 15 seconds. As indicated heretofore, a normally tacky and pressure-sensitive adhesive composition is then applied to the primed or barrier coated backing by any conventional coating method, as for example those indicated hereinabove suitable for coating the primer or barrier composition.

In the table which follows are examples of primer (or barrier) compositions formed in accordance with this invention and normally tacky and pressure-sensitive adhesive tapes employing said primer or barrier compositions. It will be appreciated that these formulations are exemplary and the invention should not be construed as limited to the particular materials and proportions indicated; all proportions recited are in parts by weight.

In Examples 1–8, the primer or barrier compositions are solvent coated (10% in toluene); the coating weight of each of the primer coat being about 0.02 oz./sq. yd., and the coating weight of the barrier coat being about 0.1 oz./sq. yd. In each of the examples the adhesive is solvent coated (25% in toluene) at a coating weight of about 1.5 oz./sq. yd.

The invention in its broader aspects is not limited to the specific steps, methods, compositions, combinations and improvements described but departures may be made therefrom within the scope of the accompanying claims without departing from the principles of the invention and without sacrificing its chief advantages.

What is claimed is:

1. A normally tacky and pressure-sensitive adhesive tape comprising a backing having coated on at least one major surface a coating of a composition consisting essentially of an epoxy resin formed by the reaction of a compound selected from the group consisting of a polyhydric alcohol or phenol with a halohydrin; and, elastomeric components consisting of: a water-insoluble, epoxy-reactive elastomer containing reactive groups selected from the group consisting of carboxylic, amides, amines, bromine and chlorine, and a modifying elastomer in an amount from 0 to 90% by weight of the combined weight of said epoxy reactive elastomer and said modifying elastomer, said epoxy resin being in an amount from about 1 to 20 parts per 100 parts of the elastomeric components, and on said coating a coating of a normally tacky and pressure-sensitive adhesive.

2. A normally tacky and pressure-sensitive adhesive tape according to claim 1, wherein the epoxy-reactive elastomer contains reactive carboxylic groups.

3. A normally tacky and pressure-sensitive adhesive tape according to claim 1, wherein the epoxy-reactive elastomer is selected from the group consisting of diene polymers and copolymers containing reactive carboxylic groups.

4. A normally tacky and pressure-sensitive adhesive tape according to claim 1, wherein the epoxy-reactive elastomer is a butadiene-acrylonitrile copolymer containing carboxylic groups.

5. A normally tacky and pressure-sensitive adhesive tape according to claim 1, wherein the backing is a film and wherein the coating in contact with said film serves as a primer coat for anchoring said adhesive to said film.

6. A normally tacky and pressure-sensitive adhesive tape according to claim 1, wherein the backing is a porous sheet and wherein the coating in contact with said porous sheet serves as a barrier coat for preventing migration of said adhesive through said porous sheet.

7. A normally tacky and pressure-sensitive adhesive tape according to claim 1, wherein the epoxy-reactive elastomer is in an amount at least 25% by weight of the total elastomeric components.

8. The method of manufacturing a normally tacky and pressure-sensitive adhesive tape comprising: applying to at least one major surface of a tape backing a coat of a composition consisting essentially of an epoxy resin formed by the reaction of a compound selected from the group consisting of a polyhydric alcohol or phenol with a halohydrin; and, elastomeric components consisting of: a water-insoluble, epoxy-reactive elastomer containing reactive groups selected from the group consisting of carboxylic, amides, amines, bromines and chlorine, and a modifying elastomer in an amount from 0 to 90% by weight of the combined weight of said epoxy reactive elastomer and said modifying elastomer, said epoxy resin being in an amount from about 1 to 20 parts per 100 parts of the elastomeric components, aging said composition under suitable time and temperature conditions to cause said composition to bond to the backing, and applying on said coat, a coat of a normally tacky and pressure-sensitive adhesive.

References Cited in the file of this patent

UNITED STATES PATENTS

| | | |
|---|---|---|
| 2,763,571 | Wooding et al. | Sept. 18, 1956 |
| 2,795,515 | Lavanchy | June 11, 1957 |
| 2,799,596 | Frantz | July 16, 1957 |
| 2,947,338 | Reid et al. | Aug. 2, 1960 |

FOREIGN PATENTS

| | | |
|---|---|---|
| 524,051 | Canada | Apr. 17, 1956 |